United States Patent [19]

MacArthur

[11] 4,146,878

[45] Mar. 27, 1979

[54] VIDEO DISPLAY APPARATUS DISPLAY MODIFICATION

[75] Inventor: Ian D. MacArthur, Stockport, England

[73] Assignee: Data Recording Instrument Co. Ltd., Staines, England

[21] Appl. No.: 768,963

[22] Filed: Feb. 16, 1977

[30] Foreign Application Priority Data

Feb. 20, 1976 [GB] United Kingdom ............... 06709/76

[51] Int. Cl.[2] ................................................ G06F 3/14

[52] U.S. Cl. .................................... 340/724; 358/153; 340/736; 340/748

[58] Field of Search ................ 340/324 AD; 358/148, 358/153, 156, 264

[56] References Cited

U.S. PATENT DOCUMENTS

| | | | |
|---|---|---|---|
| 3,298,013 | 1/1967 | Koster | 340/324 AD |
| 3,423,749 | 1/1969 | Newcomb | 340/324 AD |
| 3,491,200 | 1/1970 | Wisnieff | 340/324 AD |

*Primary Examiner*—Marshall M. Curtis
*Attorney, Agent, or Firm*—Hane, Roberts, Spiecens & Cohen

[57] ABSTRACT

In visual display apparatus in which characters are displayed by modulation of a TV type raster on a cathode ray tube, the normally uniform spacing of the sweep lines of the raster is selectively modified to produce groups of lines having decreased spacing therebetween. The groups of lines are modulated to display rows of characters on the screen of the cathode ray tube. The spacing of the remaining lines between the groups is at the same time increased to provide a wider separation between the rows of characters thereby improving the aesthetic appearance of the display. Video modulation, synchronizing and control signals are obtained from a composite input signal. The control signals are utilized to operate a sweep modification circuit.

3 Claims, 2 Drawing Figures

VIDEO DISPLAY APPARATUS DISPLAY MODIFICATION

BACKGROUND OF THE INVENTION

Field of the Invention

This invention relates to data display apparatus and more particularly to display apparatus in which characters are displayed on the screen of a cathode ray tube.

Characters may be displayed on a cathode ray tube screen by causing the beam of the cathode ray tube to repetitively scan the screen in the manner employed in television. A horizontal deflection circuit causes the beam to sweep horizontally across the screen at a substantially uniform rate, the beam being rapidly returned to the starting point at the end of each sweep. At the same time a vertical deflection circuit causes the beam to sweep vertically down the screen. The vertical sweep is at a much lower rate than the horizontal sweep so that a large number of horizontal sweeps occur for each vertical sweep. Hence the beam traces a large number of lines across the screen, each line being displaced vertically from the preceding line. During scanning of the screen a video modulation signal is applied to the cathode ray tube so that the beam is increased in intensity each time that it is swept past any point of the screen at which portions of those characters which it is desired to display are situated and thus a plurality of dots on the screen are illuminated by the electron beam and these dots together form the outlines of the required characters. During the remainder of the scanning of the screen the electron beam is cut off so that the remainder of the screen is not illuminated.

Normally the displayed characters are arranged in horizontal rows and a group, for example seven, of successive horizontal line sweeps are utilised to display a row of characters. In order to space one row of characters from a preceding row of characters, it is necessary to ensure that at least one line of the horizontal sweep between successive groups of horizontal sweeps is not modulated. If only a single horizontal line sweep is used for spacing between adjacent rows of characters it has been found that the spacing between the rows is inadequate. Adequate spacing can be obtained by utilising more than one line sweep for row spacing but then the number of rows of characters which could be displayed with a particular scanning arrangement would be reduced.

SUMMARY OF THE INVENTION

According to the invention data display apparatus includes a cathode ray tube having a screen and means for producing an electron beam to impringe on the screen;

first deflection means operative repetitively to generate a first deflection waveform to sweep the electron beam of the cathode ray tube in a first direction across the screen of the cathode ray tube;

second deflection means operative repetitively, at a lower rate than the first deflection means, to generate a second deflection waveform to sweep the electron beam in a second direction, perpendicular to the first direction, across the screen of the cathode ray tube to cause the electron beam to sweep along a plurality of parallel lines having a first spacing on the screen;

means responsive to video signals to modulate the electron beam of the cathode ray tube to produce outlines of a plurality of characters on the screen of the cathode ray tube during each of successive groups of sweeps of the electron beam in the first direction; and sweep modification means responsive to a control signal to modify the rate of sweep of the second deflection means to modify the spacing between selected sweep lines to a second spacing different from said first spacing.

BRIEF DESCRIPTION OF THE DRAWINGS

An embodiment of the invention will now be described, by way of example, with reference to the accompanying drawings in which.

DESCRIPTION OF PREFERRED EMBODIMENT

Figure 1:
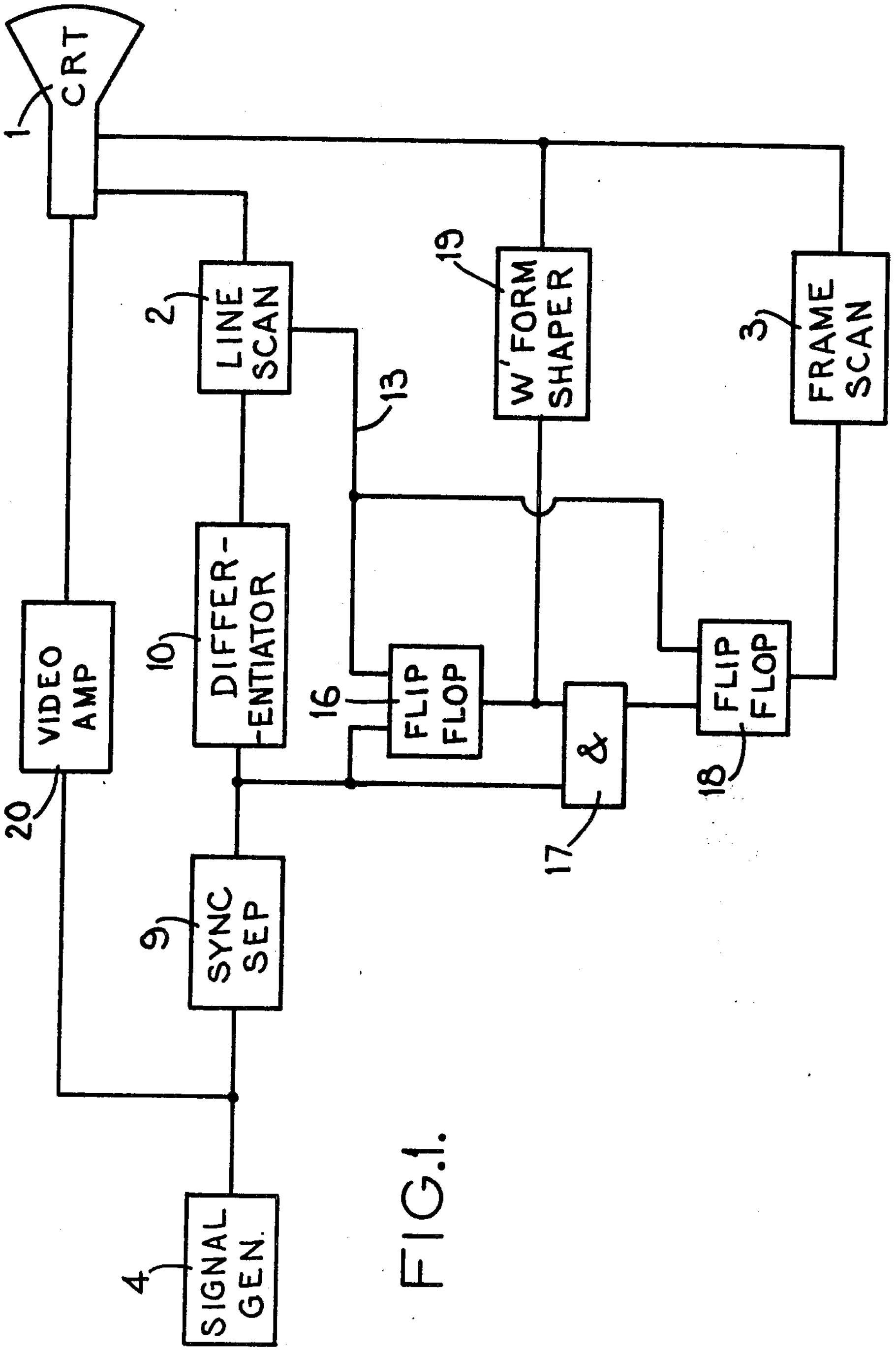
FIG. 1 is a block diagram of video display apparatus in accordance with the invention.

Referring to FIG. 1 of the drawing, characters to be displayed by the video display apparatus are formed as brightened dots, arranged in a configuration corresponding to the character outline, on the screen of a cathode ray tube 1. The electron beam of the cathode ray tube is caused to trace out a raster pattern by line scan generator 2 and a frame scan generator 3. The line scan generator 2 generates a waveform which is applied to the horizontal (X) deflection system of the cathode ray tube such that the electron beam is swept horizontally across the screen at a uniform rate and at the end of the sweep is rapidly returned to the start of the next sweep. Simultaneously the frame scan generator 3 generates a waveform which is applied to the vertical (Y) deflection system of the cathode ray tube such that the electron beam is swept vertically at a uniform rate, substantially lower than the sweep rate in the horizontal direction, and hence each horizontal line swept by the beam is displayed vertically relative to the previously swept line.

A composite video waveform, as shown in FIG. *2a,* is generated by a signal generator 4. The composite waveform is composed of negative going line syncchronising pulses 5 recurring at time intervals equal to the required time between successive horizontal sweeps of the line scan generator 2, negative going frame synchronising pulse 6, of longer duration than the pulses 5, and recurring at time intervals equal to the required time between successive vertical sweeps of the frame scan generator 3, negative going control pulses 7 and positive going video signals 8. The composite waveform from the generator 4 is applied to a synchronising pulse separator 9. The synchronising pulse separator 9 consists of a clipping circuit and is effective to remove the video signals 8 from the composite waveform. One output from the synchronising pulse separator 9 is passed through a differentiator 10 which produces a short negative pulse 11 (FIG. *2b*) corresponding to the leading edge of each line sync pulse 5,, frame sync pulse 6 and control pulse 7. These negative pulses 11 recur at equal time intervals and are applied to the line scan generator 2 to maintain the line scan waveform in synchronism with the composite signal from the generator 4.

The line scan generator 2 produces a pulse (fly-back pulse) at the end of each horizontal line sweep during the period in which the CRT beam is returned rapidly to the start of the next succeeding line sweep. A line gate signal (FIG. 2c) is derived from the fly back pulses and is applied to line 13. The line gate signal consists of pulses 12 and with the line scan generator 2 correctly synchronised with the line sync pulses 5, the pulses 12 have a timing such that the back edge 14 of each pulse occurs after the back edge 15 of the corresponding line sync pulse 5.

Figure 2:
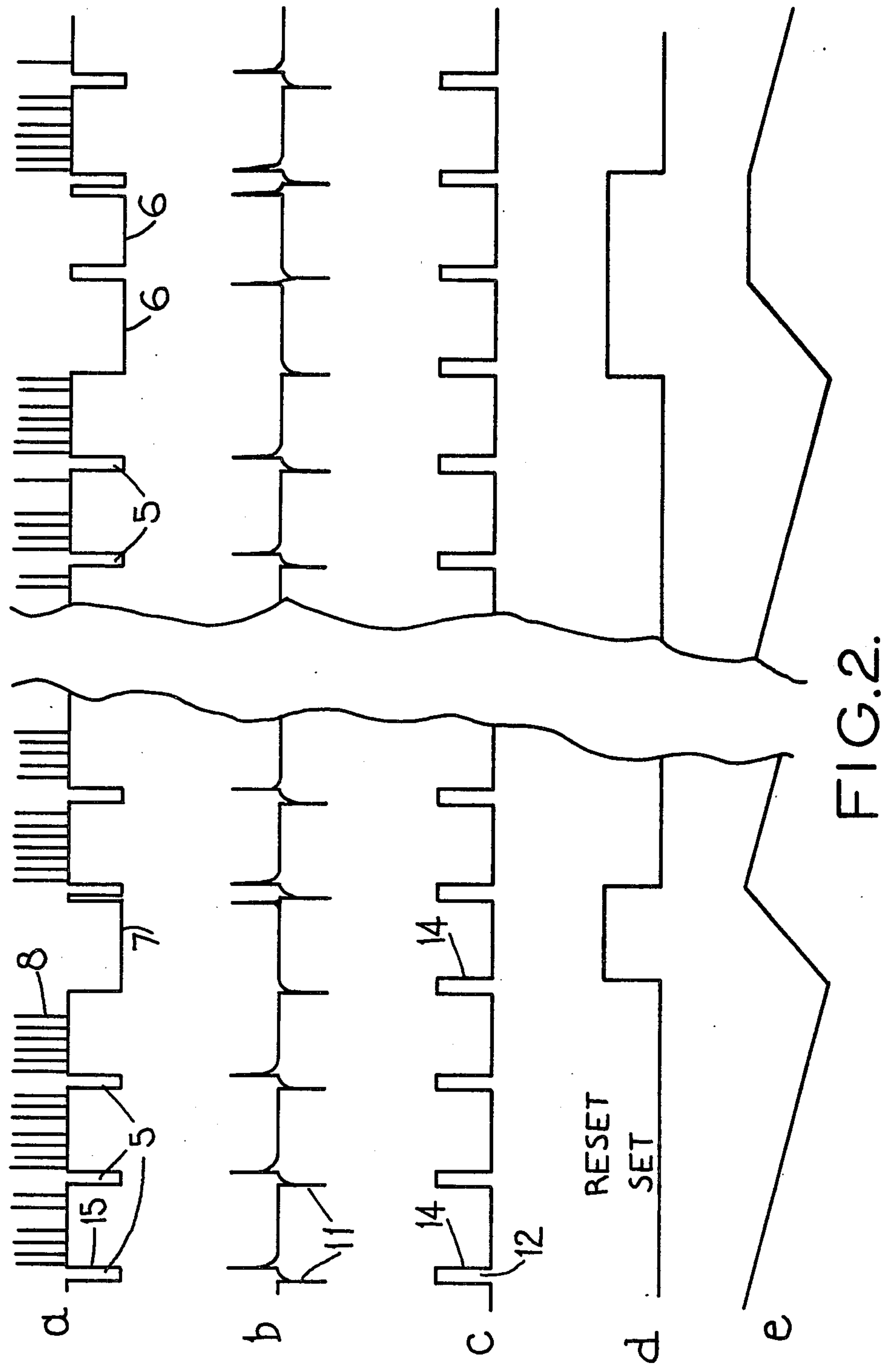
FIG. 2 shows various waveforms occurring in the apparatus of FIG. 1.

A flip flop 16 is clocked by the back edges 14 of the line gate pulses 12 on line 13 and a second output from the sync separator 9 is applied to the flip flop 16 so that the flip flop 16 is switched to a set state if the back edge 14 of the line gate pulse 12 occurs after a negative going pulse in the composite input waveform and is reset if the back edge 14 occurs during a negative going pulse. Thus the flip flop 16 is set after the occurrence of a line sync pulse 5 and is reset upon the occurrence of a frame sync pulse 6 or a control pulse 7 as shown in FIG. 2d.

The reset output from the flip flop 16 and the output from the sync separator 9 are applied as two inputs to an AND gate 17. The output of AND gate 17 and the line gate signal pulses 12 on line 13 are applied to the inputs of a second flip flop 18. If the flip flop 16 is in the set state, the next sync pulse from the sync separator will produce an output from AND gate 17. When the back edge 14 of the line gate signal 12 occurs after a sync pulse, i.e. after a pulse 5 the flip flop 18 will be set but when the back edge 14 occurs during a sync pulse, i.e. along pulse 6, the flip flop 18 will be reset.

Thus when a long negative going pulse 6, 7 occurs in the composite signal, flip flop 16 is reset and when a long negative going pulse 6 occurs immediately following a long negative going pulse 6, flip flop 18 is reset. Since the frame sync signal consists of a group of two or more long pulses 6, the flip flop 18 is reset by the frame sync signal and the reset output of the flip flop 18 is utilised to effect synchronisation of frame scan generator 3.

The reset output from flip flop 16 which consists of a long pulse, having a duration approximately equal to one horizontal sweep, generated in response to a control pulse 7 is applied to a waveform shaper 19 which is effective to produce a sawtooth waveform (FIG. 2e), having a linear positive slope for the duration of the pulse from the flip flop 16. This sawtooth waveform is combined with the output of the frame scan generator in such a manner that for the duration of the pulse from the flip flop 16, the rate of vertical sweep is increased thereby resulting in an increase in spacing between the horizontal lines swept by the line scan generator immediately succeeding and preceding the control signal 7. It will be realised that the remainder of the sawtooth waveform of FIG. 2e will result in a decrease in the rate of vertical sweep. Thus the effect of the waveform of FIG. 2e on the raster is to cause the horizontal lines to be grouped with less than normal inter-line spacing and with a spacing between the groups greater than two normal line spaces.

The composite signal generator 4 is arranged to generate for each line in a group of horizontal scanning lines video signals which are applied to a video amplifier 20 to modulate the electron beam of the cathode ray tube such that at the end of scanning the group of lines a complete row of required characters is displayed on the screen of the CRT. These video signals preferably are pulses which cause the character outlines to be displayed as illuminated dots of a dot matrix. Following the end of scanning the last line of the group, the signal generator 4 generates a control signal 7 which may be derived from a counter and which, as previously explained, causes the vertical or frame scan to sweep at a higher rate during the next line sweep when the electron beam is blanked out. The generator 4 then generates for the next group of lines the video signals necessary to display the next row characters.

If desired the signal generator may be arranged to generate the control signals between each pair of successive rows of characters or only between selected rows of characters whereby the rows of characters may be displayed in groups of rows with wider spacing between the groups than between the rows in a group. Also means may be provided whereby the control signal is generated, or is effective, only on a selective basis under the control of an operator so that the operator can select whether the spaces between rows are to be normal or wider than normal. Thus, for example, the display unit may be provided with a switch which enables the operator to inhibit the waveform shaper 19.

While the control signal has been described as being a negative going pulse having the same duration as the pulses forming the frame sync. signal, a pulse of shorter duration could be utilised provided that it is distinguishable from the line sync pulses 5. In the described embodiment it is necessary that the back edge of the pulse 7 occurs later than the back edge 14 of the line gate pulses.

I claim:

1. Data display apparatus including a cathode ray tube having a screen and means for producing an electron beam to impinge upon the screen;

first beam deflection means operable to generate first deflection signals to sweep the electron beam in a first direction across a plurality of character display positions on the cathode ray tube screen;

second beam deflection means operable to generate second deflection signals to deflect the beam in a second direction perpendicular to the first direction to cause the first beam deflection means to sweep the beam along a plurality of groups of substantially parallel lines, the lines having substantially uniform spacing;

a signal generator operative to generate a composite waveform, the waveform including video signals lying between first and second levels, and first, second and third control signals lying between the second level and a third level, the second level lying between the first and third levels; the video signals occurring in the composite waveform in groups, each group representing a row of characters to be displayed on the screen and one of said third control signals occurring in time intervals between selected groups of video signals;

a signal separator responsive to said composite waveform to separate therefrom the first, second and third control signals, the signal separator being operative in response to the first control signals to apply first synchronising signals to the first beam deflection means to maintain the first deflection signal in synchronisation with the composite waveform and being operative in response to the second control signals to apply second synchronising signals to the second beam deflection means to maintain the second deflection signals in synchronisation with the composite waveform;

means operative in response to each group of video signals to modulate the beam of the cathode ray tube while the beam sweeps along the spaced lines of one of said groups of lines to display one row of characters on the screen;

and waveform modication means operative in response to each third control signal to modify the second deflection signals to cause the line spacing between rows of characters corresponding to said selected groups of video signals to be greater than said uniform spacing.

2. Data display apparatus as claimed in claim 1 in which the first control signals each consist of a first pulse of first duration, the third control signals each consist of a second pulse of second duration longer than said first duration and the second control signals each consist of a pair of said second pulses;

and including means operative to generate further pulses delayed relative to each first pulse by a time period less than said second duration;

and in which said signal separator includes a first bistable device having a set state and a reset state, said device being switched to the set state in response to one of said further pulses occurring immediately after one of said first pulses and being switched to the reset state in response to the occurrence of one of said further pulses within the duration of one of said second pulses;

said waveform modifying means being responsive to the first bistable device being in its reset state to cause the line spacing between adjacent ones of the groups of lines to be greater than the uniform line spacing.

3. Data display apparatus as claimed in claim 2 in which the signal separator includes a second bistable device having first and second states, said second device being switched to its first state in response to the first bistable device being in its reset state during the occurrence of one of said second pulses and being operative when in the first state to apply the second synchronising signal to the second deflection means.

* * * * *

UNITED STATES PATENT AND TRADEMARK OFFICE
CERTIFICATE OF CORRECTION

PATENT NO. : 4,146,878

DATED : March 27, 1979

INVENTOR(S) : Ian Douglas MacArthur

It is certified that error appears in the above-identified patent and that said Letters Patent are hereby corrected as shown below:

Assignee: International Computers Limited
London, England

Signed and Sealed this

*Fifteenth* Day of *April 1980*

[SEAL]

*Attest:*

SIDNEY A. DIAMOND

*Attesting Officer* *Commissioner of Patents and Trademarks*